(12) United States Patent
Kanoh (10) Patent No.: US 8,206,038 B2
(45) Date of Patent: Jun. 26, 2012

(54) LINEAR MOTION GUIDE UNIT WITH MEANS FOR KEEPING CAGE AGAINST STRAYING OR WANDERING

(75) Inventor: Shinji Kanoh, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 218 days.

(21) Appl. No.: 12/723,217

(22) Filed: Mar. 12, 2010

(65) Prior Publication Data

US 2010/0247007 A1     Sep. 30, 2010

(51) Int. Cl.
*F16C 19/00*     (2006.01)

(52) U.S. Cl. ................. 384/57; 384/47; 384/51

(58) Field of Classification Search ............ 384/47, 384/51, 57
See application file for complete search history.

(56) References Cited

U.S. PATENT DOCUMENTS

| | | | |
|---|---|---|---|
| 6,736,541 B2 | 5/2004 | Kamimura et al. | |
| 6,886,983 B2 * | 5/2005 | Tsuboi et al. | 384/51 |
| 6,971,797 B2 | 12/2005 | Obara et al. | |
| 7,210,849 B2 * | 5/2007 | Yamazaki et al. | 384/47 |
| 2002/0114546 A1 * | 8/2002 | Vegh et al. | 384/51 |
| 2003/0108256 A1 * | 6/2003 | Kamimura et al. | 384/51 |
| 2007/0201778 A1 * | 8/2007 | Kakei | 384/51 |

FOREIGN PATENT DOCUMENTS

| | | |
|---|---|---|
| JP | 2003176820 A | 6/2003 |
| JP | 2004197850 A | 7/2004 |

* cited by examiner

*Primary Examiner* — Thomas R Hannon
(74) *Attorney, Agent, or Firm* — Browdy and Neimark, PLLC (57) ABSTRACT

A pinion-holder assembly is compact in size to fit easily within a transverse area of a raceway defined between raceway grooves on guideway members. The pinion-holder assembly is preferable to fit securely into a cage plate with ease, helping lessen required number of parts, simple and compact in construction, and less costly to fabricate. A holder has sides bulged widthwise into triangular shapes in transverse section to closely conform to the raceways on the guideway members and recesses lying in the lengthwise direction at apexes or ridges of the triangular shapes. A cage plate has a window of rectangular shape longer in sides in the lengthwise direction of the cage plate, and the longer sides have fringes somewhat raised inside the window so as to fit into the recesses on the holder, hereby fastening the holder to the cage plate.

4 Claims, 8 Drawing Sheets

FIG. 18 ated earlier, however, the pinion holder 6 as shown in FIG.
LINEAR MOTION GUIDE UNIT WITH MEANS FOR KEEPING CAGE AGAINST STRAYING OR WANDERING

FIELD OF THE INVENTION

The present invention relates generally to a linear motion guide unit of the type hereinafter referred to as "finite linear motion guide units" because of their construction where a pair of lengthwise guideway members lies movable relatively to one another by virtue of more than one rolling element retained in a cage to roll between the guideway members and, more particular, to a finite linear motion guide unit that is provided therein with means for keeping a cage against straying or wandering out of a desired location relative to the guideway members.

BACKGROUND OF THE INVENTION

With current finite linear motion guide units of the sort recited just above, the cage holding rolling elements therein at lengthwise regular intervals is disposed between the guideway members in a way moving over half of a stroke which is the distance the guideway members travel or move past each other in lengthwise direction. In prior finite linear motion guide units, however, the cage used to stray in increments from a desired location it should be relative to the guideway members, dependent on a diversity of working conditions including variations in load carried on the guide unit, processing accuracy of guideway grooves machined on the guideway members, working geometry where the guide unit operates in an upright posture, high traveling velocity, high acceleration/retardation, and so on. To cope with this, most of the finite linear motion guide units have conventionally the cage with means for preventing the cage from straying or wandering. An example of the prior means for preventing the cage from wandering installed in the finite linear motion guide units is composed of a rack-and-pinion arrangement in which the cage has a pinion while the guideway members have racks, respectively, so that the pinion comes into mesh with the rack to keep the cage in place with respect to the guideway members.

A finite linear motion guide unit has been shown before in the commonly assigned Japanese Laid-Open Patent Application No. 2004-197 850. As disclosed in FIGS. 4-6, 8-10 and 14 in the above-cited reference, a pinion holder 6 is inserted into a window 30 in a cage 3 after once getting deformed elastically by itself, and then released from the deforming stress to fit snugly into the window to come into engagement with the cage 3. Next, a pinion shaft 36 is forced into a bearing recess in the pinion holder 6 to carry the pinion 5 for rotation. To retain surely the pinion holder 6 inside the window 30, the pinion holder 6 has a flange 46 extending out of any side 42 of the pinion holder 6 so as to come into abutment against any one surface (for example, the reverse) of an edge 34 around the window 30, and a snap hook 40 extending out of the other side of the pinion holder 6 to come into engagement with another surface (for example, the obverse) of the edge 35 around the window 30.

Figure 1:
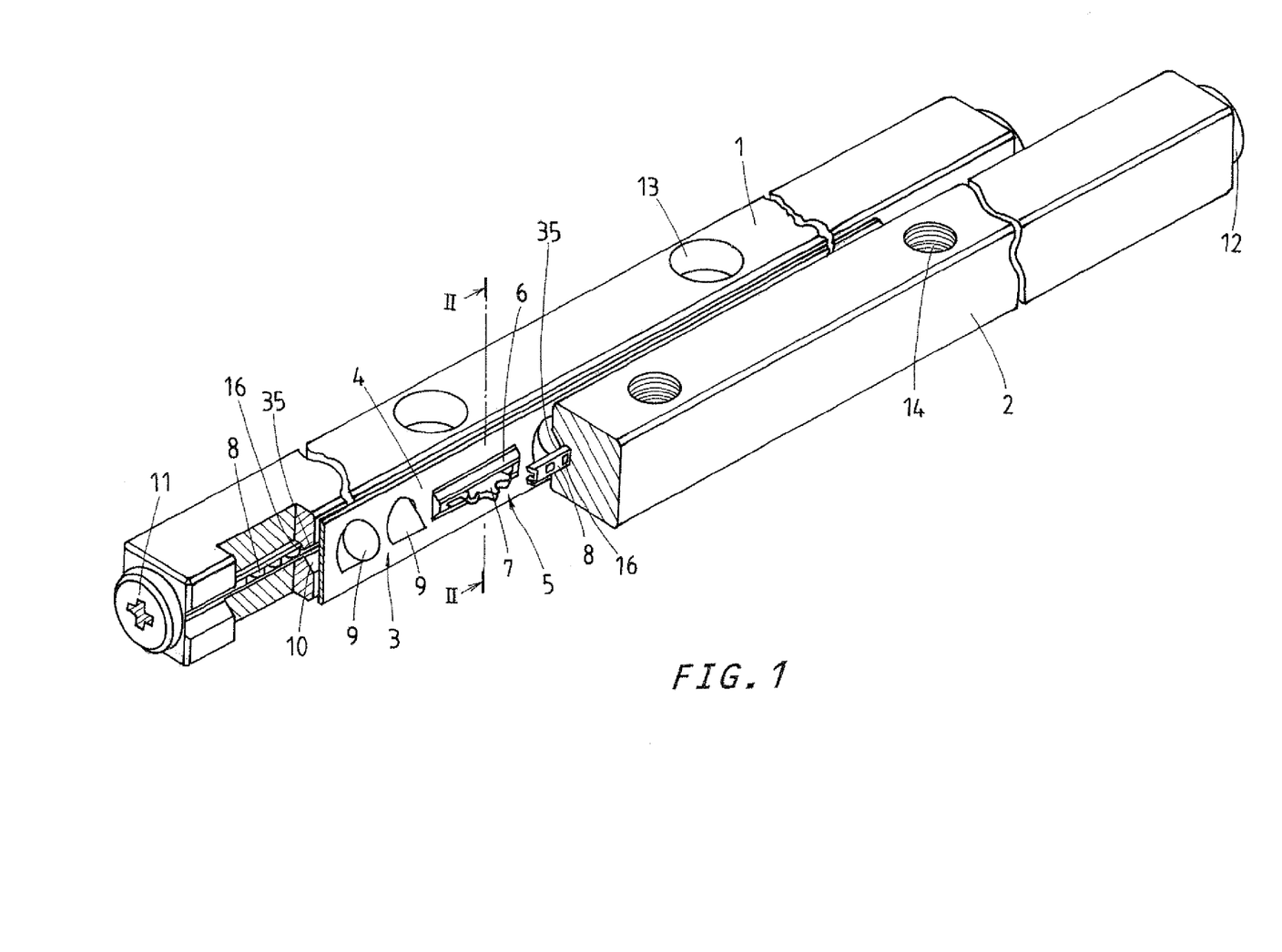
FIG. 1 is a perspective view, partially broken away, showing a preferred embodiment of a finite linear motion guide unit having therein a means for keeping a cage against any straying or wandering according to the present invention.
Figure 2:
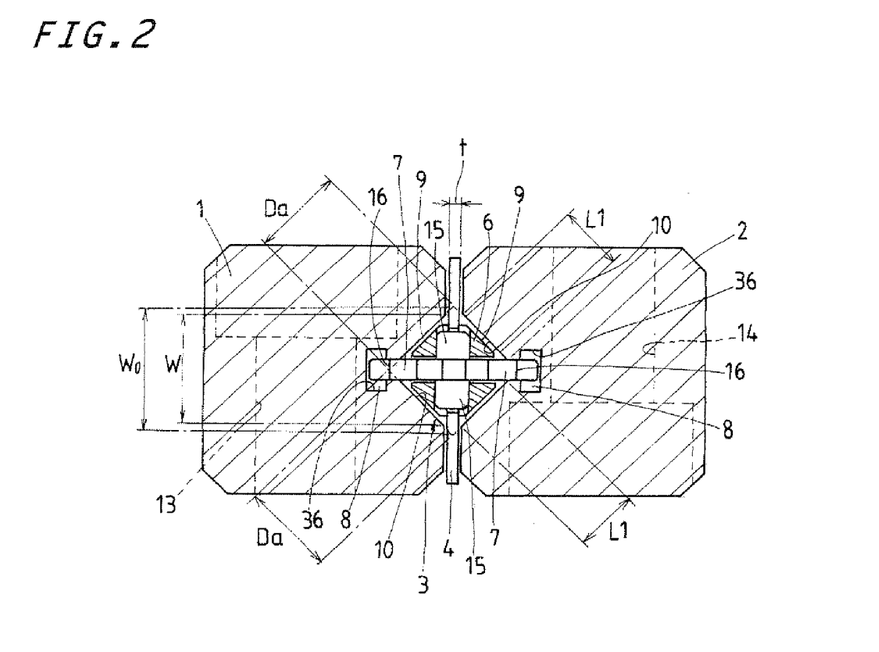
FIG. 2 is a view in transverse section of the finite linear motion guide unit, the view being taken along the plane lying on the line II-II of FIG. 1 passing through an axial center of a pinion.
Figure 3:
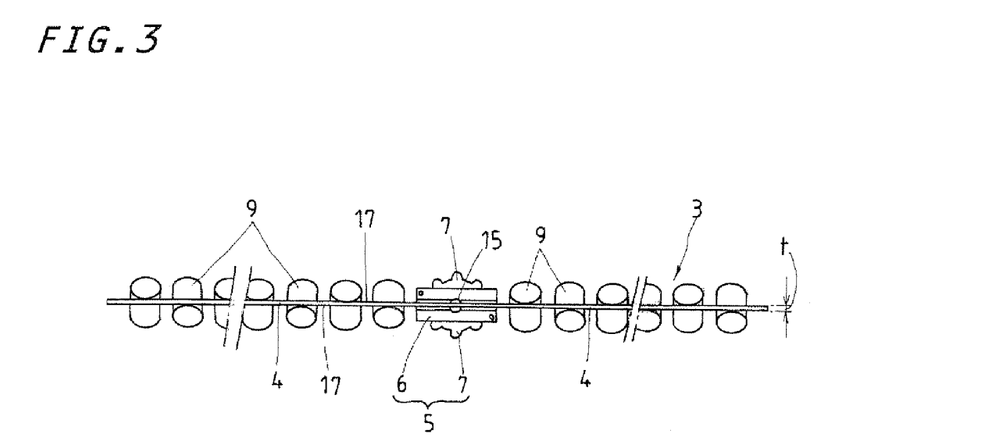
FIG. 3 is a view in front elevation, partially cut away, of a cage assembly for the finite linear motion guide unit of FIG. 1.

With the prior finite linear motion guide unit constructed as stated earlier, however, the pinion holder 6 as shown in FIG. 2 has a transverse section wider than a raceway groove 10 of a guideway member 1 or 2 to fill a clearance between wall surfaces 15 and 16 opposite to each other of the guideway members 1 and 2, with the result that the raceway groove 10 of V-shape gets inevitably less in depth. Thus, the raceway area where a raceway surface 11 or 12 comes into rolling contact with a rolling element 8 of cylinder gets less in effective load-carrying width. Consequently, the finite linear motion guide unit could carry only lighter load.

Modern industries are in need of the finite linear motion guide unit having the guideway members more in load-carrying capacity than ever as well as capable of operating under working conditions which expect the guideway members to travel or move past relatively each other with higher acceleration/retardation. To deal with the need as stated earlier, the finite linear motion guide unit of the present invention has the capacity of carrying heavy loads and also has the rack-and-pinion arrangement inexpensive in construction to prevent the cage from straying or wandering lengthwise, thereby keeping the cage in correct place with respect to the guideway members even under high acceleration/retardation. Thus, the finite linear motion guide unit developed according to the present invention is tolerable to higher loads and suitable for working condition of higher acceleration/retardation than in the conventional finite linear motion guide units.

SUMMARY OF THE INVENTION

The present invention has as its primary object to provide a finite linear motion guide unit in which guideway members, one of which is mounted on any stationary base such as machine beds and the other has mounted with any movable body including tables, mounting flange and so on, are constructed to tolerate more severe working conditions of heavier loads, higher acceleration/retardation, and so on than ever. More especially, the major purpose of the present invention is to provide a finite linear motion guide unit in which the smaller pitch or distance between the center-lines of adjacent rollers that are installed in a cage results in the greater number of the rollers lying in a preselected length of the cage to get an effective raceway area where a raceway groove comes into rolling contact with the roller as wide as possible to thereby enhance the load-carrying capacity, and further in which a mechanism for keeping the cage in place against straying or wandering has a pinion-and-holder assembly installed in the cage, the pinion-and-holder assembly being constructed in size to fit easily within a transverse area of a raceway defined between the raceway grooves on the guideway members, the pinion-and-holder assembly being composed of a pinion holder and a pinion received in the holder for revolution, and the pinion holder being designed to fit securely into the cage with ease, helping lessen required parts in number for the means for keeping the cage in place rendering the means for keeping the cage in place compact in construction and less costly to fabricate.

The present invention is concerned with a linear motion guide unit comprising a linear motion guide unit; comprising a pair of guideway members lying movable relatively to one another and having raceway grooves on their sides opposite to each other and extending in lengthwise direction, a flat cage plate extending in the lengthwise direction and retaining therein more than one rolling element of roller which is positioned at regular intervals in the lengthwise direction to roll through a raceway defined between the raceway grooves on the guideway members, and a mechanism for keeping the cage plate against straying or wandering out of a desired relative location to the guideway members, the mechanism being made up of a rack-pinion arrangement composed of a holder fitted into the cage plate, a pinion carried for rotation inside the holder, and racks lying in the lengthwise direction of the guideway members, one to each member, and in mesh with the pinion;

wherein the cage plate has a window to fit over or conforms to the holder, which has sides in the lengthwise direction of the guideway members extended in the lengthwise direction and bulged into triangular shapes in transverse section to closely conform to the raceway grooves on the guideway members to be stowed inside the raceway, the holder having recesses lying in the lengthwise direction at apexes or ridges of the triangular shapes, the recesses each having a width parallel with a thickness of the cage plate, and wherein the cage plate has edges around the window to fit into the recesses of the holder, hereby fastening the holder to the cage plate.

In an aspect of the present invention, a linear motion guide unit is disclosed in which the cage plate is made of an elongated web of rectangular shape having all-over flat major surfaces, and the window is positioned at lengthwise midst of the cage plate, the window having a rectangular shape longer in sides in the lengthwise direction of the cage plate, the longer sides having fringes raised inside the window above the edges of the window so as to fit into the recesses on the holder, fastening the holder to the cage plate.

In another aspect of the present invention, a linear motion guide unit is disclosed in which the window in the cage plate is flanked by elliptic openings successive in the lengthwise direction, any two adjacent openings of which are positioned at the regular interval of 1.2 times a diameter of the roller.

In a further another aspect of the present invention, a linear motion guide unit is disclosed in which the holder is composed of a pair of holder halves bulged widthwise into the triangular shapes and provided therein with bearing holes to carry for rotation pinion shafts of the pinion, the holder halves having mating surfaces opposite to each other and guide surfaces dependable for safety guide of the pinion, and the holder halves come into mating with each other along the mating surfaces lying at a midst of a face width of the pinion to provide an integral construction for the holder.

With the linear motion guide unit having the pinion-holder assembly installed in the cage plate as stated earlier, the edge around the window cut in the cage plate fits partly into the recesses slit in the holder to fasten the holder to the cage plate, as a result of which the holder is retained firmly without wobbling in the cage plate. This constructional feature of the present invention helps keep certain mesh of the pinion carried in the holder with the racks laid on the guideway members, hereby making sure of the linear motion of the guideway members relative to each other without ever causing displacement of the cage out of a desired relative location to the guideway members even under higher acceleration/retardation. With the linear motion guide unit of the present invention, moreover, the raceway groove of V-shaped in transverse section is cut larger in depth as well as in width than ever to make larger the effective width of raceway surface across which the raceway surfaces of the guideway members come into rolling-contact with the rollers, making certain of the high load-carrying capacity.

The holder carrying the pinion therein is advantageously compact in size to fit easily within the transverse area of the raceway defined between the raceway grooves cut in the guideway members, or within the axially transverse section of the roller. Moreover, the pinion-holder assembly is preferable to fit securely into the cage plate with ease, helping lessen required number of parts, simple and compact in construction, and less costly to fabricate.

DETAILED DESCRIPTION OF THE PREFERRED EMBODIMENTS

A finite linear motion guide unit constructed according to the present invention is adapted for use in between relatively sliding parts of a variety of machinery including semiconductor fabricating machines, precision measuring machines, precision inspection equipment, assembly machines, industrial robots, and so on.

Embodiments of a finite linear motion guide unit with a mechanism for keeping a cage against wandering or straying according to the present invention will be described in detail with reference to the accompanying drawings.

A preferred embodiment of the finite linear motion guide unit of the present invention, as shown in FIGS. 1 to 5, includes a pair of guideway members 1 and 2 allowed to travel relatively to each other over a desired length by virtue of more than one rolling element of one roller 9, a cage assembly 3 lying between the guideway members 1 and 2 to keep in place the rollers 9 at a preselected intervals in a lengthwise direction of the guideway members 1 and 2, and a mechanism for protecting the cage assembly 3 against straying or wandering in a longitudinal direction of the guideway members 1 and 2. The mechanism is made up of a rack-and-pinion arrangement that is composed of a pinion 7 held in the cage assembly 3 and racks 8 each of which fits into the guideway members 1 and 2, one to each member, to mesh with the pinion 7 to correct for "the wandering or straying" of the cage assembly out of the desired location with respect to the guideway members 1 and 2.

The guideway members 1 and 2 are made rectangular in transverse section and have raceway grooves 35 extending lengthwise on their sides lying in opposition to each other. The raceway grooves 35 are each made V-shaped in transverse section to make a pair of raceway surfaces 10. At a lengthwise bottom line on which the raceway surfaces 10 are convergent each other, there is made a relief valley 16 cut deep into which the rack 8 fits snugly. The guideway members 1 and 2 are each provided at forward and aft ends thereof with end screws 11 and 12 to fasten the racks 8 to the associated guideway members 1 and 2. Between the raceway grooves 35 of the guideway members 1 and 2 confronted with one another, there is laid the cage assembly 3, which is composed of a cage plate 4 to hold therein a plurality of cylindrical rollers 9 at preselected intervals in the longitudinal direction of the cage plate 4, and a pinion holder 6 that fits into the cage plate 4 at the lengthwise midst of the cage plate 4. The pinion 7 is carried in the pinion holder 6 for rotation by means of pinion shafts 15 lying perpendicularly to the longitudinal direction of the pinion holder 6 so as not to jut out of the pinion holder 6. The pinion 7 carried in the holder 6 for rotation comes into mesh with the racks 8 fitted in the guideway members 1 and 2. The pinion 7 is flanked by openings 18 which are made at preselected intervals in the longitudinal direction of the cage plate 4. The cylindrical rollers 9 are installed in the respective openings 18 in a fashion tilting 45 degrees with respect to the all-over flat surfaces of opposite two major sides 17 of the cage plate 4 and also axial lines of any two adjoining rollers 9 intersect with one another.

The rack 8 has a ladder-like construction as disclosed in, for example, the commonly-owned JP patent No. 3 950 683. The racks 8 are placed in the relief valleys 16 lying on the guideway members 1 and 2, one to each valley. Especially, the racks 8 each fit into a slot 36, which is cut sideward into lengthwise sides defining the respective relief valley 16 to widen the bottom of the relief valleys 16. On lengthwise surfaces extending in perpendicular to the sides of the guideway members 1 and 2 having the raceway grooves 35 thereon, there are made some bolt holes 13 and 14 that are positioned lengthwise at preselected intervals to be used to fasten the guideway members 1 and 2 to any components such as moving table or counterparts such as a machine bed, basement and so on. The bolt holes 13 and 14 are countersunk to conceal the bolt heads and internally threaded to fit over the associated bolts driven from the side of the machine bed or moving table.

The finite linear motion guide unit constructed according to the present invention is intended to be more suitable for use in working conditions of heavy load and high acceleration/retardation than in the prior finite linear motion guide unit disclosed in the commonly-assigned Japanese Laid-Open Patent Application No. 2004-197 850 recited earlier.

With the finite linear motion guide unit of the present invention more suited for the high load-carrying capacity to bear heavy loads than ever, as shown in FIG. 2, the guideway members 1 and 2 are laid side to side in a fashion their confronting surfaces are even closer to each other, compared with the prior construction in which there is provided the raised portions having the fingers to retain the rollers. More especially, the guideway members 1 and 2 are placed side by side with each other in geometry that their confronting surfaces are laid even closer to the two opposite major sides 17 of the cage plate 4 having a substantial thickness t. Moreover, the raceway groove 35 of V-shaped in transverse section is cut deeper than ever to make larger an effective width L1 of raceway surface across which the raceway surface 10 comes into rolling-contact with the rollers 9, making certain of the high load-carrying capacity. The finite linear motion guide unit of the present invention proved that the effective width L1 of the raceway surface 10 lying between the guideway members 1 and 2 was as large as 1.45 times wider compared with the prior construction.

Figure 4:
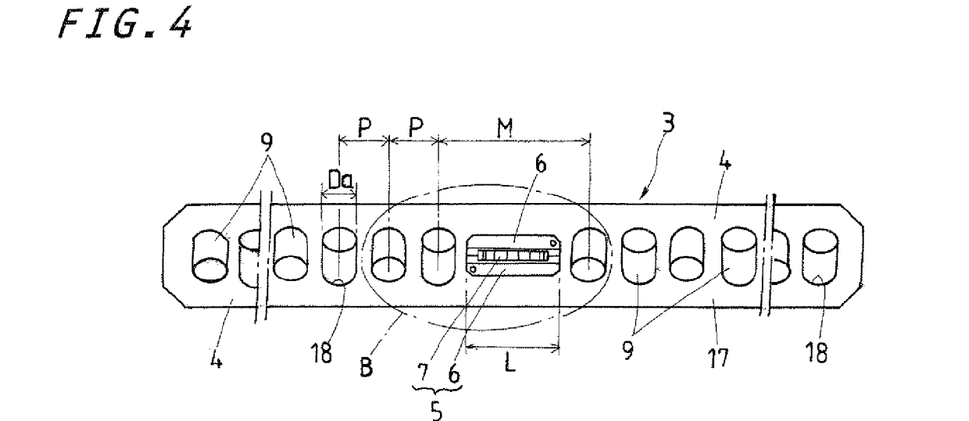
FIG. 4 is a top plan view, partially cut away, of the cage assembly of FIG. 3.
Figure 5:
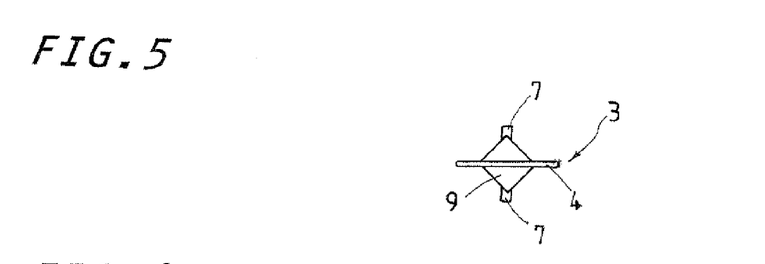
FIG. 5 is a view in side elevation of the cage assembly of FIG. 3.

Further referring to FIG. 4, there is shown the cage assembly 3 in which the rollers 9 are arranged in a relation a pitch or a distance between the center-line of any adjacent rollers 9 is as small as possible to increase the number of rollers 9 across a preselected length of the cage assembly 3. Moreover, a distance M between the center-lines of two rollers 9 between which a pinion-holder assembly 5 lies is also made small so as to take up less space. Now taking the roller 9 of diameter Da for example, the roller 9 is made to have an axial length a bit less than the diameter Da. The pitch P is to be referred to P=1.2×Da and the distance M is M<4×Da. It should be noted that the holder 6 to carry the pinion 7 in the cage assembly 3, as shown in FIG. 2, is determined in dimension to fit easily inside a transverse area of a raceway defined between the raceway grooves 35 opposite to each other, or not more than the axially sectional area of the roller 9.

The rollers 9 fit into the respective openings 18 in a fashion alternately tilting 45 degrees with respect to the all-over flat surfaces of widthwise opposite major sides 17 of the cage plate 4 so that axial lines of any two adjoining rollers 9 intersect at the right angles relative to each other. The raceway surfaces 10 opposite to each other are spaced parallel across the interval Da while the raceway surfaces 10 lying side by side are at right angles relative to each other. As a result, the raceway has a square of four sides Da when viewed in the transverse section of the raceway, or takes nearly the axial section of the roller 9.

Moreover, a width W across the V-shaped raceway groove 35 takes nearly a diagonal length Wo of the roller 9 having the diameter Da. The pinion 7 is carried for rotation in the pinion holder 6, which is designed to fit inside the transverse area of the raceway defined between the raceway grooves 35 opposite to each other. More especially, the pinion 7 is born with the pinion shafts 15 extending sidewise opposite to each other at the revolving center of the pinion 7 perpendicularly to the longitudinal direction of the pinion holder 6. Gear teeth 20 around the pinion 7 extend out of the raceway area into the relief valleys 16 to come into mesh with the racks 8, which is installed on the bottom of the relief valleys 16 lying outside the transverse section of the raceway area.

The finite linear motion guide unit of the present invention constructed as stated earlier is better for the high load-carrying capacity to bear heavy loads and further suited for the higher acceleration/retardation by virtue of the pinion-holder assembly 5, which fits into the cage plate 4 of the cage assembly 3.

Referring to FIGS. 6 to 18, there is shown the pinion-holder assembly 5 having constructional features as stated later.

First, the holder 6 for the pinion-holder assembly 5 is made up of a pair of holder halves 26 each of which has a substantially or nearly triangular shape in transverse section and comes into mating with the counterpart to provide the integral construction for the holder 6. The holder 6 is designed compact to fit easily inside the transverse area of the raceway and also inside the midway interval M in length.

With holder 6 for the pinion-holder assembly 5, secondly, the holder halves 26 are each made along their ridges 37 with lengthwise recesses 25, which are to fit over respective fringes 23 raised above an edge 24 around a window 27 cut into the cage plate 4 when the holder 6 has been forced or snapped into the window 27.

The pinion-holder assembly 5 constructed as stated just earlier needs less space for attachment and/or detachment from the cage plate 4, less number of parts or components, correspondingly becoming more compact in construction and less cost for production.

Next, the features of the pinion-holder assembly 5 will be described later in further detail.

The cage plate 4 has the window 27 into which the holder 6 fits snugly to carry the pinion-holder assembly 5 thereon. The holder 6 at widthwise opposite sides is bulged into nearly triangular shapes in transverse section so as to closely conform to the raceway surfaces 10 on the guideway members 1 and 2. The holder 6 is made in size to fit easily inside the transverse area of the raceway. The holder 6 has the recesses 25 extending lengthwise along the ridges 37 of the triangular shape. In each of the holder halves 26 for the holder 6, there is made the lengthwise recess 25 of a width that fits over or conforms to the cage plate 4. With the finite linear motion guide unit of the present invention, the holder 6 is retained in the window 27 cut in the cage plate 4 when the fringes 23 raised above the edge 24 around the window 27 has fit into the lengthwise recesses 25 on the holder halves 26.

Figure 17:
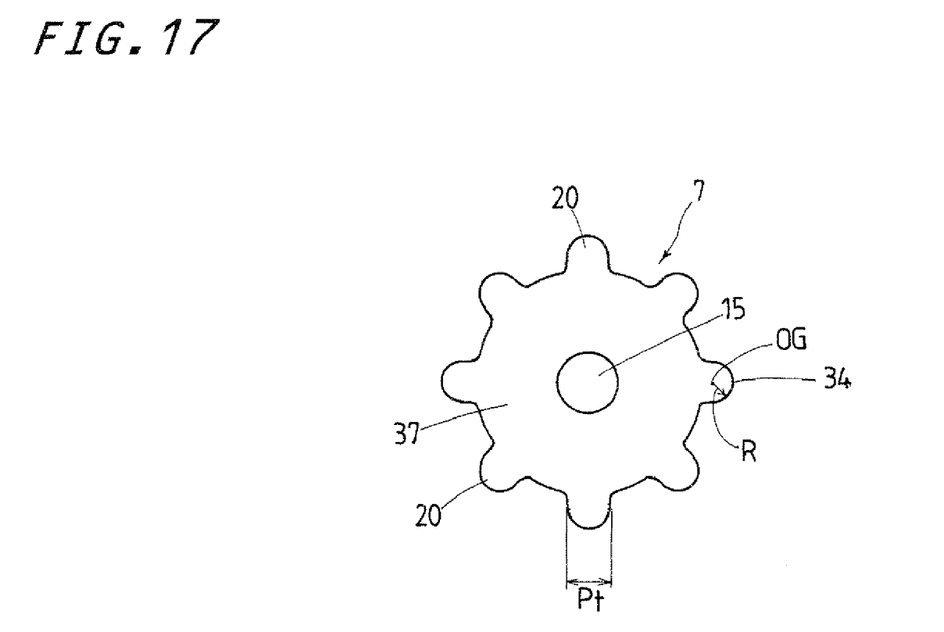
FIG. 17 is a view in front elevation of a pinion used in the finite linear motion guide unit of FIG. 1
Figure 18:
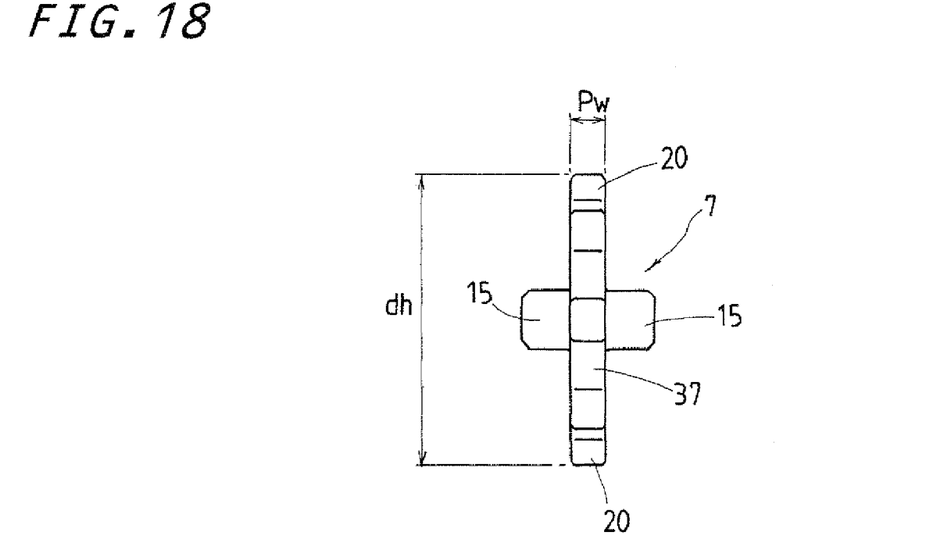
FIG. 18 is a view in side elevation showing the pinion of FIG. 17.

The pinion or small gear 7, as shown in FIGS. 17 and 18, is composed of a flat disc 37 having the pinion shafts 15 extending at the revolving center thereof in axially opposite direction to each other, and successive gear teeth 20 extending radially outwardly from a circular periphery of the flat disc 37 at circular regular intervals around the disc 37. The gear teeth 20 each has a dedendum having a tooth thickness Pt uniform over its radial distance and an addendum of a face width Pw having a tooth profile consisting of a curved line at the same distance or a radius R from a center OG. The pinion 7 is carried for rotation at the pinion shafts 15 in the holder 6 while in mesh with the racks 8 fastened to the guideway members 1 and 2. Moreover, there is also the option of an involute tooth other than the gear tooth design simple as described earlier, which could ensure smoother and more accurate mesh for the rack-pinion arrangement.

Referring to FIGS. 9 to 11 and 14 to 16, there is shown the holder 6 made up of a pair of the holder halves 26 that are designed to provide a box-like hollow to accommodate the pinion 7 therein after having joined together at mating surfaces 19 of the holder halves 26 lying on the middle of the face width Pw. The pinion 7 is flanked by the holder halves 26 combined together and carried for rotation with the pinion shafts 15, which fit into the respective holder halves 26.

Figure 14:
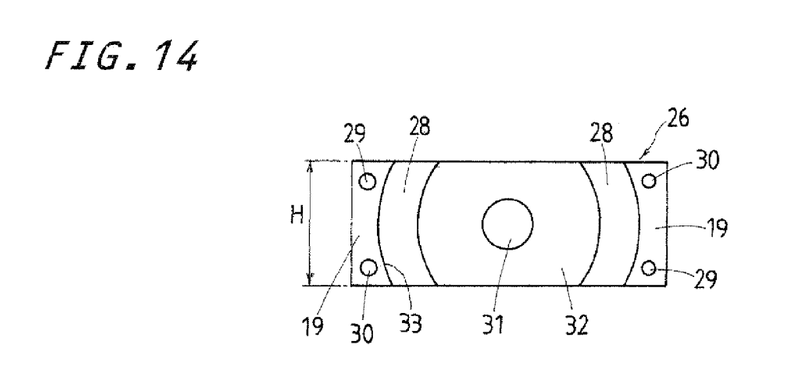
FIG. 14 is a view in front elevation of a holder half-part for the pinion-holder assembly of FIG. 9.
Figure 15:
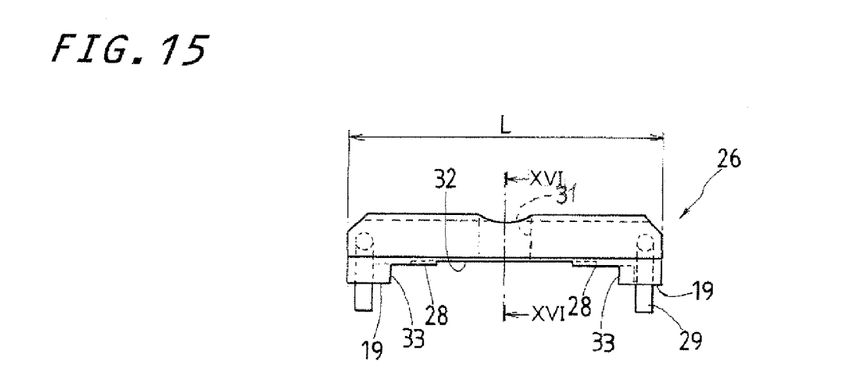
FIG. 15 is a top plan view showing the holder half-part of FIG. 14.

Referring to FIG. 14, there is shown one part of the holder halves 26 made in a rectangular shape when viewed from the mating surface 19 thereof. Each of the holder halves 26 is made at the center thereof with a bearing hole 31 into which the pinion shaft 15 fits for rotation. The holder half-part 26 measures L in length, which is set larger than an addendum diameter dh (shown in FIG. 7) of the pinion 7 so as to afford to provide the mating surface 19 at lengthwise opposite ends outside the scope of the pinion 7. In the dimensional definitions used here, the addendum diameter dh refers to a distance between top lands of the addendums diametrically opposite to each other, or a diametral distance of a circular shape consisting of curved lines across top land of any adjoining two of the successive addendums 34 around the pinion 7. The mating surface 19 on the holder half-part 26 has sunken over a circular area somewhat further out of the addendum diameter dh of pinion 7 to provide a depression 33 a bit deeper than a half the face width Pw of the pinion 7. A bottom land of the depression 33 serves as a guide surface 28 dependable for safety guide of the associated side of the pinion 7. Inward the guide surface 28 of a preselected radial width, a circular relief land 32 is formed in a way lying below the guide surface 28 between the guide surface 28 and the central bearing hole 31. In a summary, the holder 6 is made up of a pair of holder halves 26 to bear the pinion shafts 15 of the pinion 7 for rotation at their central bearing holes 31. The holder halves 26 each have the triangular shape in transverse section and the mating surfaces 19, which come into mating with the counterpart to provide the integral construction for the holder 6. On surfaces of the holder halves 26 opposite to each other across the pinion 7, moreover, there are provided the mating surfaces 19 coming into mating with each other to combine the holder halves 26 together, and the guide surfaces 28 dependable for safety guide of the associated side of the pinion 7.

Figure 16:
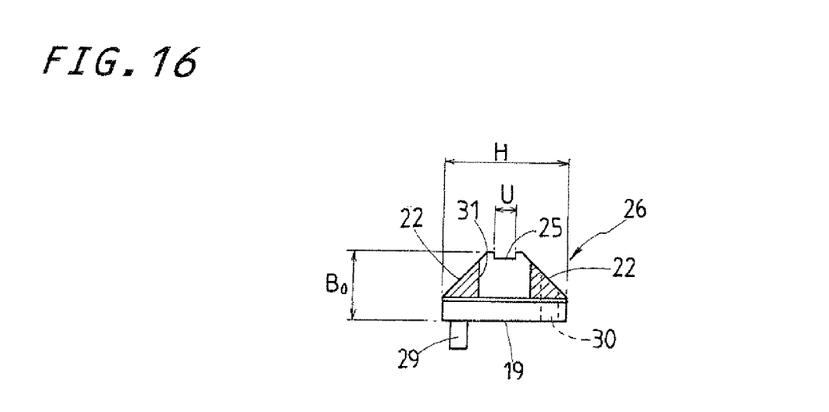
FIG. 16 is a view in transverse section taken along the plane on the line XVI-XVI of the holder half-part of FIG. 15.

The holder half-part 26 has a width H which is a matter of half the addendum diameter dh of the pinion 7. Of four corners on the mating surfaces 19 of the holder halves 26, any two corners opposite diagonally on the mating surface 19 have tenons 29, one to each corner. Other two corners opposite diagonally on the mating surface 19 have mortises 30 into which the respective tenons 29 fit when the holder halves 26 join together into the holder 6. The holder halves 26 equal with each other in construction are brought into matching to each other with their mating surfaces 19 being opposite to one another to unite into the holder 6. In this event, the tenons 29 raised above the mating surface 19 of any one of the holder halves 26 fit snugly into the corresponding mortises 30 on the counterpart. As shown in FIG. 16, the holder halves 26 at their opposite sides extending lengthwise are bulged outwards into triangular shapes in transverse section, whose sloping surfaces 22 intersect each other at right angles amid of a width H of the respective sides. An apex or ridge 37 of the triangular shape is cut away to have a recess 25 extending with a width U in the longitudinal direction of the holder 6.

Figure 9:
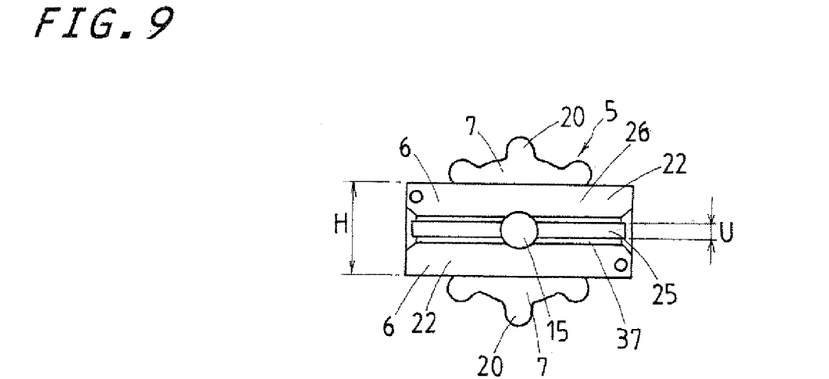
FIG. 9 is a view in front elevation of a pinion-holder assembly to be incorporated in the cage assembly of FIG. 1.
Figure 10:
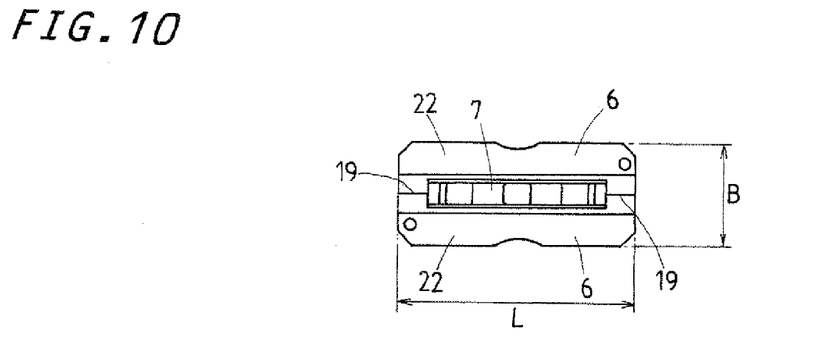
FIG. 10 is a top plan view showing the pinion-holder assembly of FIG. 9.
Figure 11:
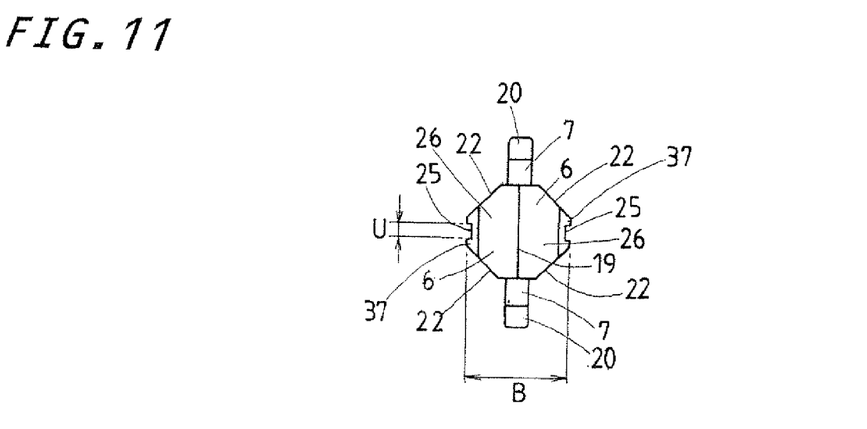
FIG. 11 is a view in side elevation of the pinion-holder assembly of FIG. 9.

Referring to FIGS. 9 to 11, there is shown in detail the pinion-holder assembly 5 composed of the holder 6 and the pinion 7 harbored inside the holder 6. To complete the holder 6, the holder halves 26 are brought into joining together on their mating surfaces 19 after their tenons 29 raised above the mating surfaces 19 have fit into the corresponding mortises 30 bored into another mating surface 19. Upon assembly of the pinion 7 with the holder 6, the pinion 7 is harbored inside the holder 6 in a way the pinion shafts 15 are carried for rotation in the bearing holes 31 in the holder halves 26. With the holder 6 constructed as stated earlier, the widthwise opposite sides extending lengthwise of the holder 6 are bulged outwards to form nearly the triangular shapes in transverse section, each of which has the sloping surfaces 22 that merge with each other at right angles. More especially, as any two just opposite sloping surfaces 22 of the holder halves 26 is equal to other two just opposite sloping surfaces 22 of the holder halves 26, the holder 6 as shown in FIG. 11 has an overall shape of regular prism, which extends lengthwise and has a near-perfect square, or a square cut away at corners, tilted 45 degrees when viewed from the end of the united holder halves 26. As seen in FIG. 2, the sloping surfaces 22 on the holder halves 26 are placed closely to the respectively associated raceway surfaces 10 of the guideway members 1 and 2. The holder 6 is moreover made with the recesses 25 extending with the width U in the longitudinal direction of the holder 6 on the apexes or ridges 37 opposing across any one diagonal B in the near-perfect square as stated earlier. The pinion 7 is placed in the holder 6 in geometry the successive teeth 20 around the pinion 7 protrude from the holder 6 at corners opposing across another diagonal H in the near-perfect square as stated earlier.

Figure 6:
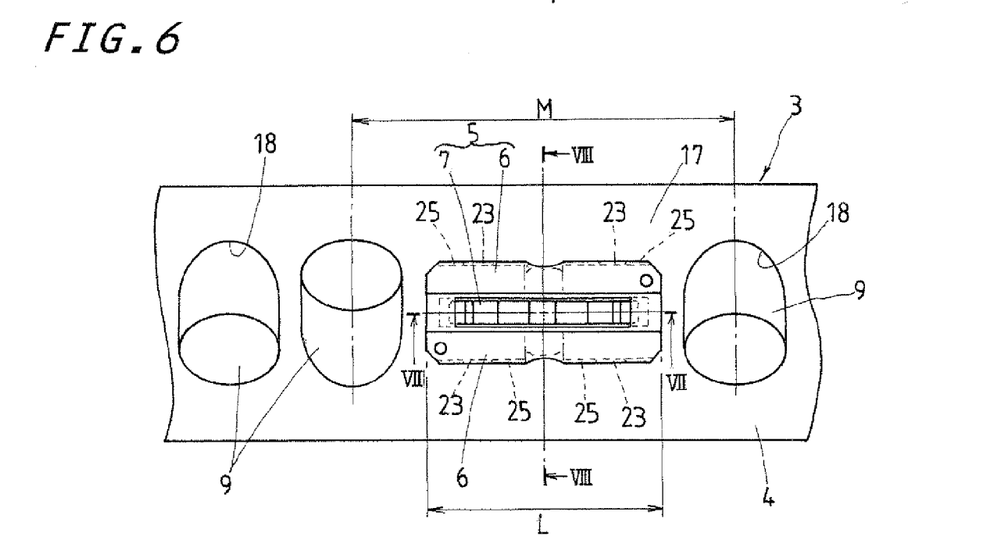
FIG. 6 is an enlarged fragmentary top plan view of an area encircled with sign B in the cage assembly of FIG. 4.
Figure 12:
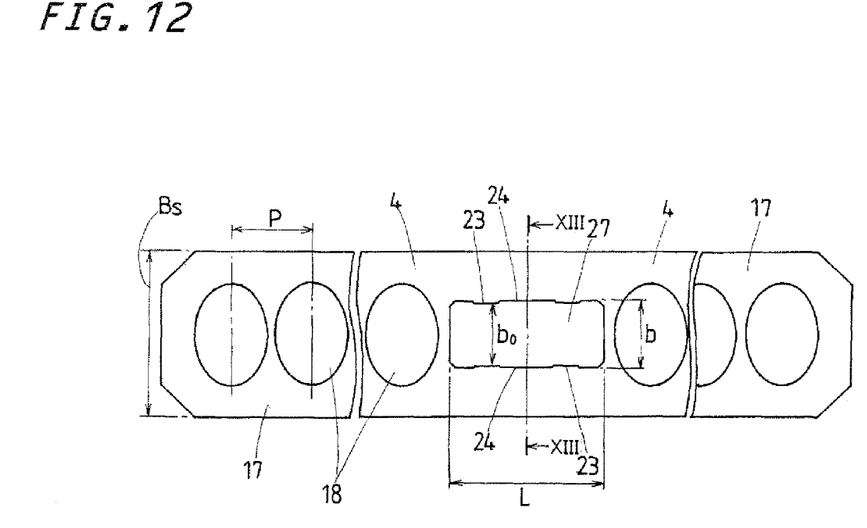
FIG. 12 is a top plan view, partially cut away, of a cage plate for the cage assembly of FIG. 4.
Figure 13:
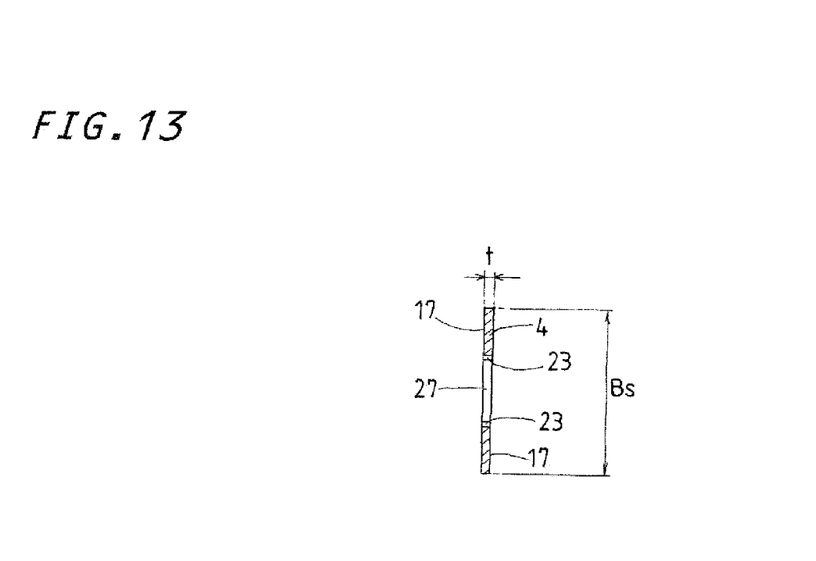
FIG. 13 is a view in transverse section view taken along the plane on the line XIII-XIII of the cage plate of FIG. 12.

Referring to FIGS. 2, 12 and 13, there is shown the cage plate 4 made of an elongated web of rectangular shape having the all-over flat major surfaces on the two sides 17 opposite across the substantial thickness t. The cage plate 4 has a width Bs which is set larger than the width W across the V-shaped raceway groove 35, but smaller than the width or height of the guideway member 1 or 2. The cage plate 4 further has the window 27 to retain the pinion-holder assembly 5 in the cage plate 4 at lengthwise midst as well as widthwise midst of the cage plate 4. The window 27 is of a rectangular shape having a length L in the longitudinal direction of the cage plate 4 and a width b. The window 27 is flanked by the openings 18 into which the rollers 9 fit, respectively. The openings 18 are arranged on the midst of the width Bs at regular intervals P in the lengthwise direction of the cage plate 4. Each of the openings 18 has an elliptic shape major in a direction perpendicular to the lengthwise direction of the cage plate 4 to receive or stow the rollers 9, one to each opening, therein in geometry that the axial axis of the roller 9 lies in perpendicular to the lengthwise direction of the cage plate 4 while tilting 45 degrees with respect to the major sides 17 of the cage plate 4. The window 27 cut in the cage plate 4 has a rectangular shape longer in lengthwise direction than in widthwise direction of the cage plate 4. On the longer sides of the window 27, there are provided the fringes 23 (paired fringes to each longer side shown in FIG. 12) raised above the edges 24 inwards or into the window 27. The fringes 23 on the longer sides or edges 24 are positioned to stand face to face with each other across the window 27, hereby reducing the width b of the window 27 to a narrow width b0 between the opposite fringes 23. The pinion-holder assembly 5 as shown in FIG. 6 is firmly held within the window 27 of the cage plate 4 in a way that the lengthwise recesses 25 cut into the holder halves 26 joined together into the holder 6 fit snugly over or conform to the fringes 23 around the window 27.

Figure 7:
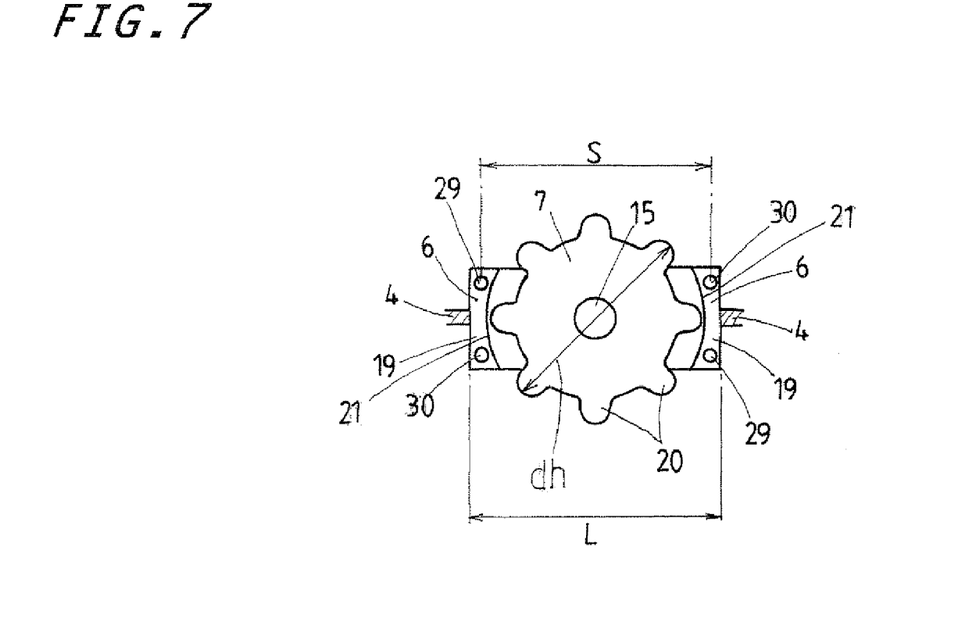
FIG. 7 is a view in section taken along the plane lying on the line VII-VII in the area B of the cage assembly of FIG. 6.
Figure 8:
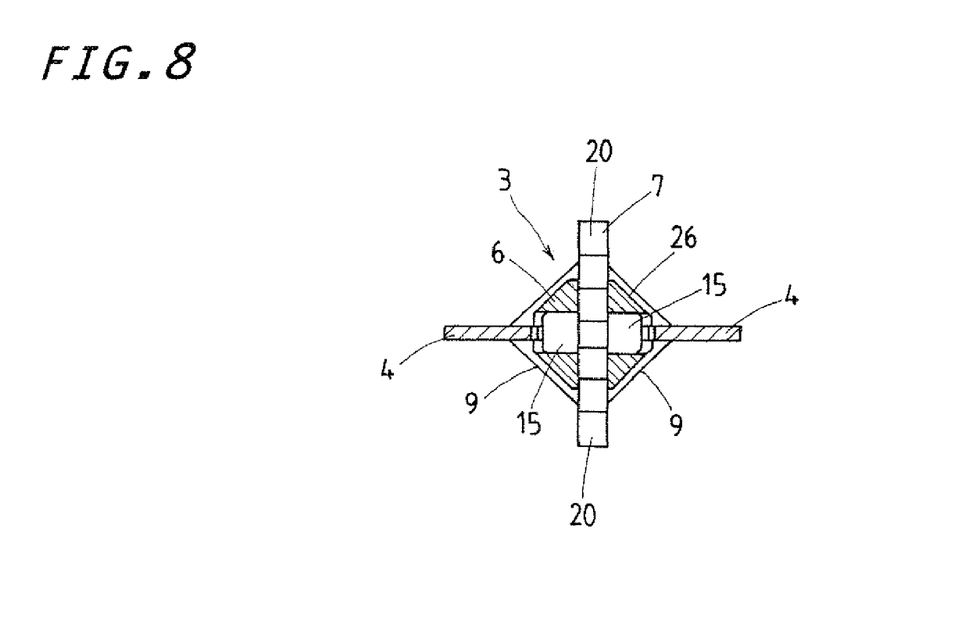
FIG. 8 is a view in section taken along the plane lying on the line VIII-VIII in the area B of the cage assembly of FIG. 6.

The subtle relation in dimensions between the pinion-holder assembly 5 and the window 27 in the cage plate 4 makes possible the firm fitness or engagement of the pinion-holder assembly 5 with the cage plate 4. More especially, as shown in FIGS. 7 and 8, the pinion-holder assembly 5 has the holder 6 of the width B (shown in FIG. 10) which allows the pinion-holder assembly 5 to fit closely into the window 27 of the width b (shown in FIG. 12) in the cage plate 4. And further the length L of the holder 6 parallels the length L of the window 27. Thus, the pinion-holder assembly 5 is permitted to fit snugly into the window 27 of the cage plate 4. For fastening the pinion-holder assembly 5 to the cage plate 4, the pinion-holder assembly 5 is forced or pushed into the window 27 in the cage plate 4 to get the recesses 25 around the holder 6 snap-fitting over or catching the fringes 29 raised inwards the window 27 of the cage plate 4. The length between the fringe 29 and the fringe 30 is shown as length S in FIG. 7.

What is claimed is:
1. A linear motion guide unit; comprising:
a pair of guideway members lying movable relatively to one another and having raceway grooves on their sides opposite to each other and extending in lengthwise direction,
a flat cage plate extending in the lengthwise direction and retaining therein more than one rolling element of roller which is positioned at regular intervals in the lengthwise direction to roll through a raceway defined between the raceway grooves on the guideway members, and
a mechanism for keeping the cage plate against straying or wandering out of a desired relative location to the guideway members, the mechanism being made up of a rack-pinion arrangement composed of a holder fitted into the cage plate, a pinion carried for rotation inside the holder, and racks lying in the lengthwise direction of the guideway members, one to each member, and in mesh with the pinion;
wherein the cage plate has a window to fit over or conform to the holder;
wherein the holder has a dimension in a transverse section to fit snugly within just a transverse area of the raceway defined between the raceway grooves opposite to each other, the holder having sides extended in the lengthwise direction and bulged into triangular shapes in a transverse section to closely conform to the raceway grooves on the guideway members, and the holder having recesses lying in the lengthwise direction at apexes or ridges of the triangular shapes;
wherein the recesses each have a width parallel with a thickness of the cage plate; and
wherein the cage plate has edges around the window to fit into the recesses of the holder, thereby fastening the holder to the cage plate.

2. A linear motion guide unit constructed as defined in claim 1, wherein the cage plate is made of an elongated web of rectangular shape having all-over flat major surfaces, and the window is positioned at lengthwise midst of the cage plate, the window having a rectangular shape longer in sides in the lengthwise direction of the cage plate, the longer sides having fringes raised inside the window above the edges of the window so as to fit into the recesses on the holder, fastening the holder to the cage plate.

3. A linear motion guide unit constructed as defined in claim 1, wherein the window in the cage plate is flanked by elliptic openings successive in the lengthwise direction, any two adjacent openings of which are positioned at the regular interval of 1.2 times a diameter of the roller.

4. A linear motion guide unit constructed as defined in claim 1, wherein the holder is composed of a pair of holder halves bulged widthwise into the triangular shapes and provided therein with bearing holes to carry for rotation pinion shafts of the pinion, the holder halves having mating surfaces opposite to each other and guide surfaces dependable for safety guide of the pinion, and the holder halves come into mating with each other on the mating surfaces lying along a midst of a face width of the pinion to provide an integral construction for the holder.

* * * * *